Feb. 22, 1938.   C. J. VILLERUP   2,109,440
TRACTOR TRUCK LOADER
Filed Nov. 20, 1936   3 Sheets-Sheet 1
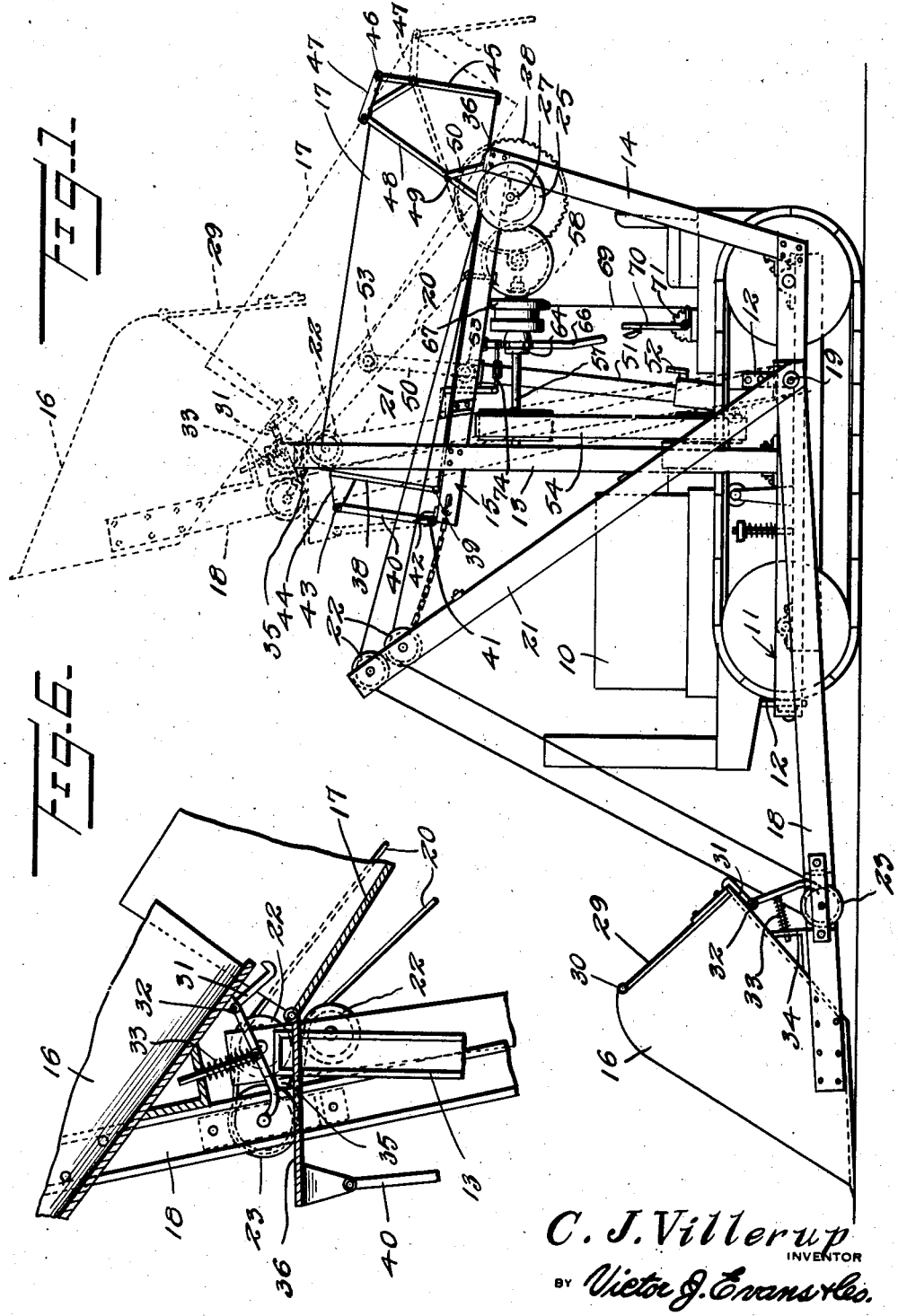
C. J. Villerup
INVENTOR
BY Victor J. Evans & Co.
ATTORNEY Feb. 22, 1938.  C. J. VILLERUP  2,109,440
TRACTOR TRUCK LOADER
Filed Nov. 20, 1936  3 Sheets-Sheet 2
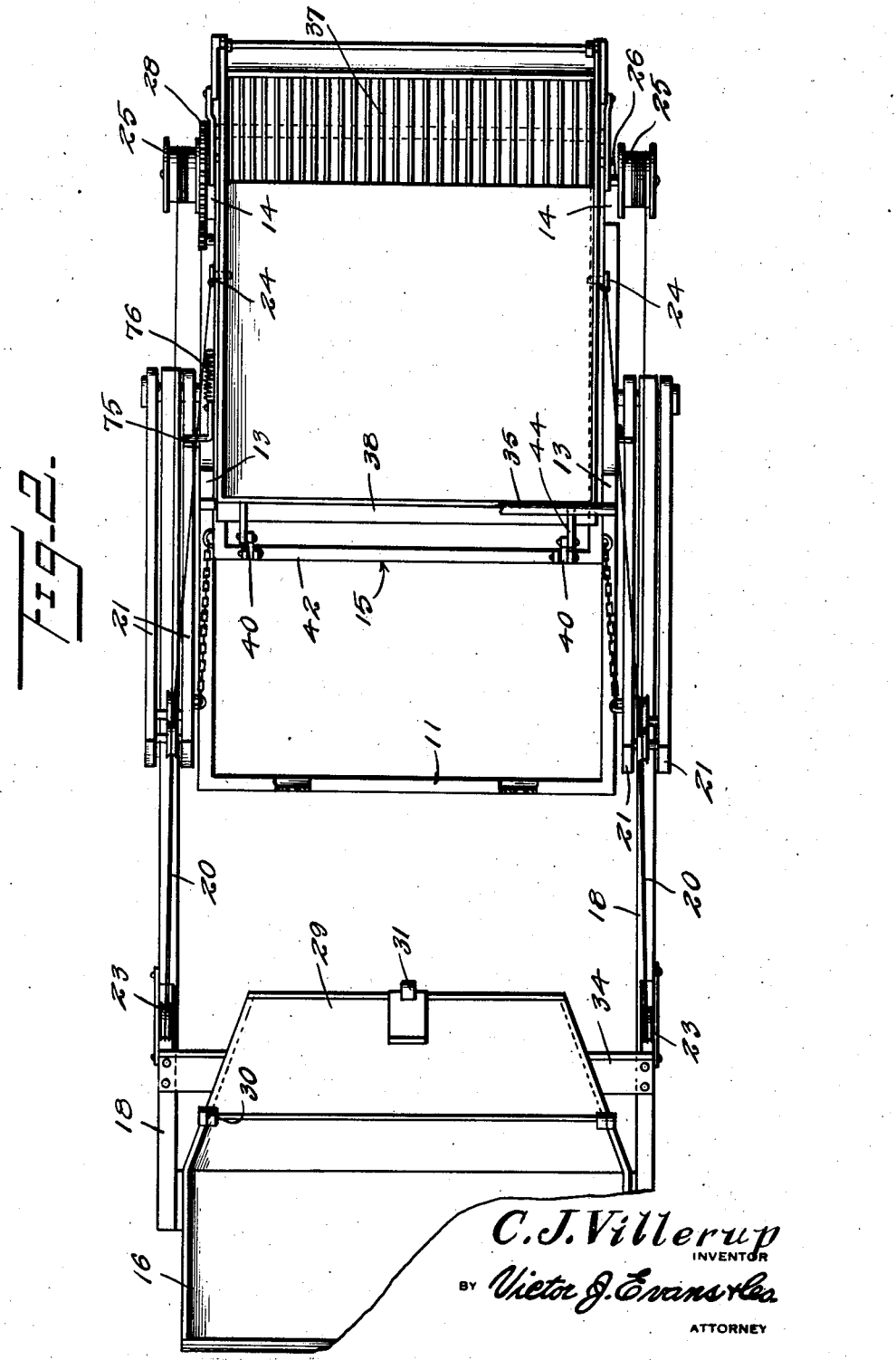

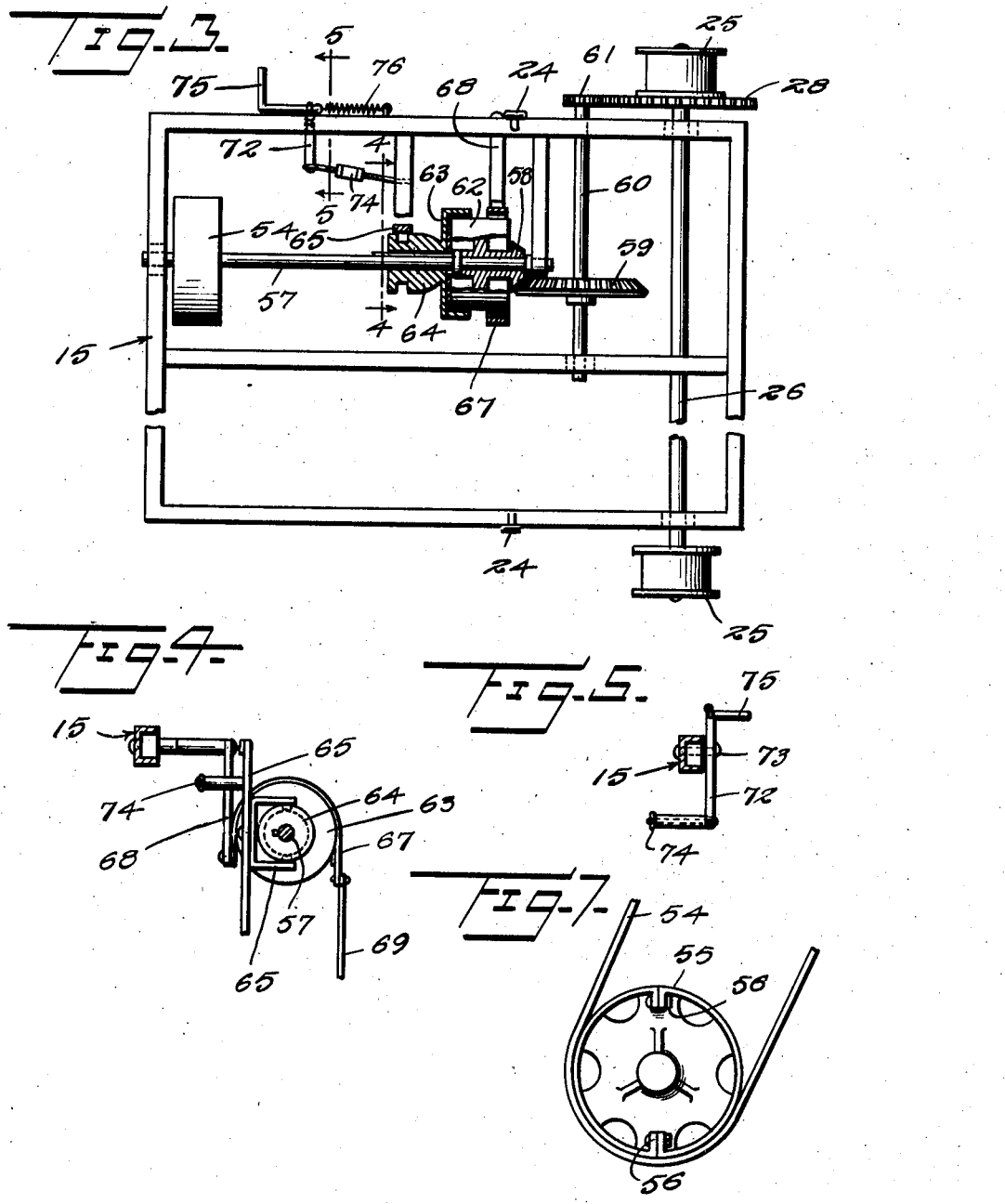

Patented Feb. 22, 1938

2,109,440

UNITED STATES PATENT OFFICE 2,109,440

TRACTOR TRUCK LOADER

Chris J. Villerup, Glasgow, Mont.

Application November 20, 1936, Serial No. 111,913

2 Claims. (Cl. 214—130)

This invention relates to tractor truck loaders and has for an object to provide apparatus which may be mounted on a conventional caterpillar tractor and which will include a bucket which may be thrust forward into the material to be loaded by advancing the tractor then may be raised to dumping position and the contents thereof discharged into a box which may be filled and later elevated to discharge its contents into a truck or other conveyance or may be maintained in elevated position to provide a chute for delivering the contents of the bucket to a truck parked in back of the tractor.

A further object is to provide apparatus of this character which may be easily controlled by a single operator and will be formed of a few strong simple and durable parts, which will be easy to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of a tractor truck loading apparatus constructed in accordance with the invention.

Figure 2 is a plan view of the apparatus shown in Figure 1 with parts removed.

Figure 3 is an enlarged detail plan view showing the box supporting frame, the winding drums for raising and lowering the bucket and clutch controlled mechanism for rotating the drums.

Figure 4 is a detail sectional view taken on the line 4—4 of Figure 3.

Figure 5 is a detail cross sectional view taken on the line 5—5 of Figure 4 showing the trip lever for de-clutching the clutch at the upper limit of movement of the bucket.

Figure 6 is a detail sectional view showing the trip device for releasing the dump gate of the bucket.

Figure 7 is a detail rear elevation of the actuating pulley of the belt drive.

Referring now to the drawings in which like characters of reference designate similar parts in the various views, 10 designates a conventional caterpillar tractor. In carrying out the invention a substantially rectangular frame 11 is suspended from the chassis of the caterpillar tractor by brackets 12. A pair of uprights 13 rise from the longitudinal members of the frame 11 about midway the ends thereof and a pair of rearwardly inclined bars 14 are secured to the rear ends of the longitudinal members. The uprights and the bars support a substantially rectangular frame 15. The parts just enumerated form the supporting frame structure for a bucket 16 and a box 17.

The bucket 16 is provided with rearwardly extending arms 18 which are pivoted at the rear ends on stub shafts 19 that project from the longitudinal sills of the frame 11 near the rear ends thereof. A pair of booms support the lifting cables 20 of the bucket, each boom comprising a pair of arms 21 which are pivoted at their lower ends upon the same stub shaft 19 to which the arms 18 of the bucket are pivoted, and these arms 21 incline upwardly and forwardly on either side of the associated arm 18 of the bucket. The lifting cables 20 are trained over pulleys 22 carried by the upper ends of each pair of arms 21 and over pulleys 23 carried by the bucket arms 18.

One end of each cable is fixedly secured to the longitudinal sills of the upper supporting frame 11 by clamps 24 and the opposite end is connected to a winding drum 25 fixed to a transverse shaft 26 which is supported in bearings 27 on the longitudinal sills. The shaft is power driven by means of a gear train 28 so that the cables may be wound upon the drums to lift the bucket 16 until the bucket arms 18 strike against the pulleys 22 of the booms whereupon during continued winding up of the cables the booms will be rocked on their pivots 19 as a unit with the arms 18 until the bucket arrives at its dumping position as shown by dotted lines in Figure 1.

A dump gate 29 forms the rear wall of the bucket the gate being pivoted at its upper edge to the bucket as shown at 30. The gate is normally held closed by an angular catch 31 which is pivoted at its elbow on the bottom of the bucket as shown at 32 and terminates in a hook which engages over the rear face of the dump gate at the bottom thereof. The lever is normally held in its latching position by an expansion spring 33 which is connected to the catch and to a bracket 34 fixed to the bottom of the bucket. When the bucket is elevated to its dumping position the long leg of the angular catch 31 impinges against a cross bar 35 which connects the upper ends of the uprights 13 and is rocked by the cross bar to disengage from the dump gate and permit the weight of the contents to rock the gate open to dumping position as shown by dotted lines.

The beforementioned box 17 is hinged as shown at 36 near the rear end of the bottom of the rear transverse bar 37 of the frame 15 so that the box may be tilted upwardly to the dumping position shown in dotted lines. The front end of the box is closed by the door 38 which is pivoted at the bottom as shown at 39 to the bottom of the box. A lever 40 is pivoted at the bottom, as shown at 41, to the front transverse bar 42 of the frame 15 and at the upper end is pivoted as shown at 43 to a lug 44 which projects from the front side of the door 38 near the upper end thereof. As the box is elevated at the front end the lever 40 pulls the door 38 to open position, shown best in Figure 6. In this position of the parts the box 17 may constitute a trough to receive the contents of the bucket 16 and deliver the same to a truck, freight car, or the like, where loading of material such as beets, or other material, is to be performed.

The rear end of the box 17 is closed by a dump gate 45 which is hinged at its top as shown at 46 to the box and is provided with a pair of crank arms 47. The crank arms are connected to the upper ends of levers 48 which are pivoted intermediate their ends as shown at 49 to brackets 50 that rise from the rear transverse member 37 of the frame 15. When the front end of the box is elevated the rear end will be lowered and during this movement the levers 48 will rock the crank arms 49 to open the dump gate 45 and permit the contents of the box to be discharged.

The box is elevated by the piston 50 of a conventional hydraulic cylinder 51 that is mounted on the floor boards of the tractor and is controlled by a lever 52 of conventional type. A roller 53 is disposed on the top of the hydraulic piston 50 to engage the bottom of the box 17 near the front thereof.

For actuating the winding drums 25 a belt drive 54 is driven from a pulley 55 bolted to the fly wheel as shown at 56 in Figure 7, and drives a shaft 57, which is suitably supported by the frame 15, and extends longitudinally thereof as shown in Figure 1. The shaft is provided with a bevel pinion 58, best shown in Figure 3, which meshes with a bevel gear 59 that is fixed to a transverse shaft 60 suitably supported by the frame 15. The shaft 60 is equipped with a gear 61 which forms the initial gear of the beforementioned gear train 28.

As also shown in Figure 3, the shaft 57 is provided with a friction clutch including a drum 62 which is fixed to one section of the shaft 57 as is customary, and including a flanged friction disc 63 the hub 64 of which is splined to the other section of the shaft 57 as is customary. The shipper 65 of the splined member may be actuated by a lever 66 to engage the clutch when it is desired to wind up the cables 20 on the drums 25.

A brake band 67, best shown in Figure 4, is fixed at one end to a bracket 68 which is carried by one of the longitudinal bars of the frame 15. The brake band is connected to a pull cord 69 which extends to an angular lever 70, best shown in Figure 1. The lever is controlled by a conventional dog and segment 71. When the bucket arrives at its upper limit of movement the operator may actuate the lever 70 to tighten the brake band and stop any momentum thereof and at the same time detain the bucket in its elevated position until the load is dumped. The brake band may be slacked during gravitation return of the bucket.

As above stated the clutch may be operated by the lever 66. However, it is automatically operated at the moment the bucket arrives at its dumping position and for this purpose, as best shown in Figure 5, a substantially Z-shaped trip lever 72 is pivotally mounted as shown at 73, on a longitudinal bar of the frame 15. One end of the lever is connected by a turnbuckle 74 to the shipper 65. The other end of the lever is provided with a laterally extending stop pin 75 which projects into the path of movement of one of the booms 21 so that, as best shown in Figure 1, when the latter arrives at its upper limit of movement it will impinge against the lever 66 and swing the lever 72 to disengage the clutch. A helical expansion spring 76 returns the lever 72 to neutral position after each actuation.

Since a description of the operation has been given as the description of the parts progressed, it is thought that the construction and operation will be fully understood without further explanation.

What is claimed is:

1. The combination with a tractor, of a supporting frame, a bucket pivotally mounted on the frame, means for rocking the bucket upwardly to dumping position, a box open at both ends hinged to the frame in position to receive the dumped contents of the bucket, hinged closures for the ends of the box, crank arms connected to the hinges of the closures, levers connected to the frame and to the crank arms and adapted to open the closures when the box is rocked upwardly at the forward end to form a trough for receiving the contents of the bucket, and hydraulic means for raising and lowering the box.

2. The combination with a tractor, of a supporting frame, a bucket pivotally mounted on the frame, drum and cable means for elevating the bucket to dumping position, a dump gate for the bucket, a spring controlled catch normally holding the gate closed, a stop carried by the frame disposed in the path of movement of the catch for dislodging the catch when the bucket arrives at dumping position, a box open at both ends pivoted on the frame below the dumping position of the bucket, hinged closures for the ends of the box, means connected to the hinges of the closures and to the frame for opening the closures when the box is rocked on its pivot whereby a chute is formed to deliver the contents dumped through the open gate of the bucket, and means for elevating the box at the front end.

CHRIS J. VILLERUP.